United States Patent
Koch

(10) Patent No.: US 9,155,154 B2
(45) Date of Patent: Oct. 6, 2015

(54) OPERATING DEVICE FOR DRIVING A MULTICOLORED LIGHT SOURCE AND ILLUMINATION DEVICE

(75) Inventor: Marcel Koch, Altenbeken (DE)

(73) Assignee: Traxon Technologies Europe GmbH, Paderborn (DE)

( * ) Notice: Subject to any disclaimer, the term of this patent is extended or adjusted under 35 U.S.C. 154(b) by 897 days.

(21) Appl. No.: 13/248,365

(22) Filed: Sep. 29, 2011

(65) Prior Publication Data

US 2012/0104971 A1 May 3, 2012

(30) Foreign Application Priority Data

Sep. 29, 2010 (DE) .......................... 10 2010 046 893

(51) Int. Cl.
| | |
|---|---|
| *H05B 33/08* | (2006.01) |
| *G06F 3/044* | (2006.01) |
| *G06F 3/0488* | (2013.01) |

(52) U.S. Cl.
CPC ............ *H05B 33/0863* (2013.01); *G06F 3/044* (2013.01); *G06F 3/0488* (2013.01); *Y02B 20/36* (2013.01)

(58) Field of Classification Search
USPC ............... 340/539.23, 539.22, 539.26, 539.1; 315/291, 307–312, 249–259, 224, 225; 345/173, 177, 204, 214, 690, 207, 174, 345/175
See application file for complete search history.

(56) References Cited

U.S. PATENT DOCUMENTS

| | | | |
|---|---|---|---|
| 2008/0094356 A1 | 4/2008 | Ording et al. | |
| 2008/0315798 A1* | 12/2008 | Diederiks et al. | ............. 315/312 |
| 2009/0153352 A1 | 6/2009 | Julio | |
| 2009/0153438 A1 | 6/2009 | Miller et al. | |
| 2010/0127638 A1* | 5/2010 | Lan et al. | ..................... 315/294 |
| 2011/0074672 A1* | 3/2011 | Diederiks et al. | ............. 345/156 |

FOREIGN PATENT DOCUMENTS

| | | |
|---|---|---|
| CN | 1950791 | 4/2007 |
| CN | 1977520 | 6/2007 |
| CN | 101036106 | 9/2007 |
| CN | 101507361 | 8/2009 |
| DE | 10 2004 002 018 | 8/2005 |
| DE | 21 2007 000 076 | 8/2009 |
| DE | 10 2009 003 332 | 7/2010 |
| WO | WO 2005/084339 | 9/2005 |
| WO | WO 2005/107338 | 11/2005 |
| WO | WO 2006/103600 | 10/2006 |
| WO | WO 2006/134529 | 12/2006 |
| WO | WO 2008/092082 | 7/2008 |

\* cited by examiner

*Primary Examiner* — Tuyet Vo
(74) *Attorney, Agent, or Firm* — Cozen O'Connor

(57) ABSTRACT

An operating device (1) for driving a multicolored light source (2) is specified, comprising a touch-sensitive operating element (10), which is designed to be operated by means of touch by a user, a proximity switch (11), which is designed to switch on the touch-sensitive operating element (10) when the user approaches the touch-sensitive operating element (10), and a control device (12), which is designed to control a multicolored light source (2), wherein the control device (12) is designed to control the multicolored light source (2) with a predetermined number of colors and brightnesses, and the touch-sensitive operating element (10) is designed to select a color and a brightness from the predetermined number of colors and brightnesses depending on the touch by the user.

18 Claims, 3 Drawing Sheets

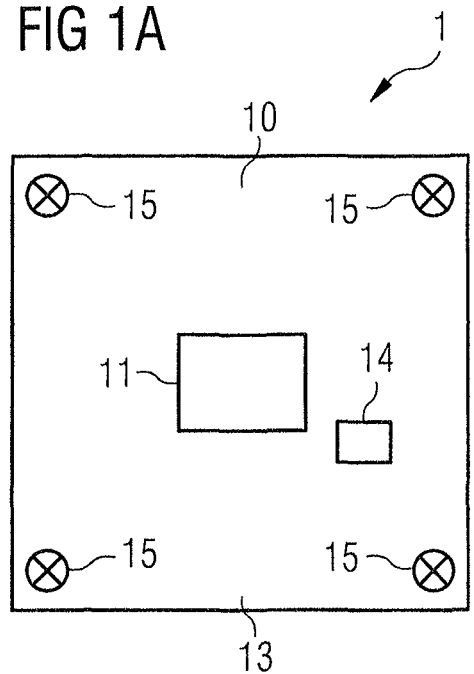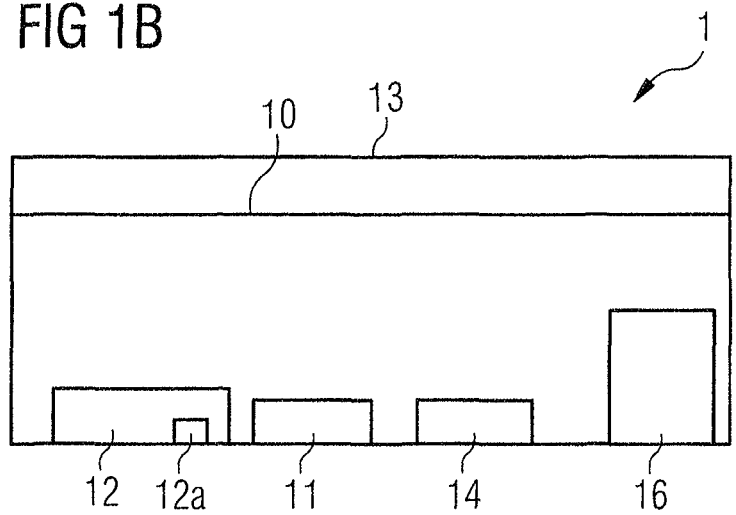

OPERATING DEVICE FOR DRIVING A MULTICOLORED LIGHT SOURCE AND ILLUMINATION DEVICE

RELATED APPLICATIONS

This application claims the priority of German application no. 10 2010 046 893.2 filed Sep. 29, 2010, the entire content of which is hereby incorporated by reference.

FIELD OF THE INVENTION

An operating device for driving a multicolored light source is specified. Furthermore, an illumination device comprising such an operating device is specified.

BACKGROUND OF THE INVENTION

The document US 2009/0153352 A1 describes an operating device.

The document WO 2008/092082 A2 describes a control device.

The document WO 2005/084339 A2 describes an illumination device.

SUMMARY OF THE INVENTION

One object of the invention is to provide an operating device for driving a multicolored light source which can be operated in a particularly simple manner.

A further object is to provide an illumination device comprising such an operating device.

In accordance with at least one embodiment of the operating device, the operating device is designed for driving a multicolored light source. The multicolored light source is a light source which can emit light having at least two different colors. Different colors are understood hereinafter to be points in a color space, for example the CIE XYZ color space, which can be distinguished from one another by a human observer. Thus, the term "colored" light is also understood to include white light. Therefore, light of different colors can hereinafter also be white light having different color temperatures or different correlated color temperatures. Furthermore, the multicolored light source is preferably designed to generate light having different brightnesses, that is to say for example having at least two different brightnesses. Two different brightnesses are understood hereinafter to be two different intensities of the emitted light which can be distinguished by the human observer.

In accordance with at least one embodiment of the operating device, the operating device comprises a touch-sensitive operating element, which is designed to be operated by means of touch by a user. For this purpose, the touch-sensitive operating element comprises, for example, an operating surface embodied as a touch screen. By way of example, the touch-sensitive operating element can then be operated by movements of a human hand with contact with said operating surface. The operating surface can then be, for example, a resistive, capacitive or inductive touch screen.

In accordance with at least one embodiment of the operating device, the operating device comprises a proximity switch, which is designed to switch on the touch-sensitive operating element when the user approaches the touch-sensitive operating element. The proximity switch reacts, for example, to the approach of a hand toward the touch-sensitive operating element. If the hand reaches a predetermined minimum distance from the operating element, then the proximity switch switches on the touch-sensitive operating element without direct contact with the touch-sensitive operating element having been made beforehand. The proximity switch can be, for example, an inductively, capacitively or optically operating proximity switch. The proximity switch switches on the touch-sensitive operating element, such that, after switch-on, it can detect and correspondingly evaluate touches by a user. It advantageously emerges here that the touch-sensitive operating element can remain switched off until it is activated by the proximity switch for operation. Therefore, it is not necessary for the touch-sensitive operating element to be continuously energized. On account of the proximity switch, the operating device can therefore be embodied in a particularly power-saving manner.

In accordance with at least one embodiment of the operating device, the operating device comprises a control device, which is designed to control the multicolored light source. The control device is designed, for example, to process the information transmitted by the touch-sensitive operating element and to drive the multicolored light source in accordance with this information. Overall, in this way, by means of touch by a user of the touch-sensitive operating element, the multicolored light source can be controlled using the control device. For this purpose, the control device comprises, for example, at least one microcontroller and at least one memory unit in which information for driving the multicolored light source is stored.

In accordance with at least one embodiment of the operating device, the control device is designed to control the multicolored light source with a predetermined number of colors and brightnesses. That is to say that, by way of example, a predetermined number of colors and brightnesses are stored in the memory unit of the control device. By means of the touch-sensitive operating element, a user can select a color and also a brightness from the predetermined number of colors and brightnesses. The control device then drives the multicolored light source in such a way that it emits light having the selected color at the selected brightness. That is to say that the touch-sensitive operating element is designed to select a color and a brightness from the predetermined number of colors and brightnesses in a manner dependent on the touch by the user. By way of example, only colors of a predetermined hue are available for selection by the user.

In accordance with at least one embodiment of the operating device for driving a multicolored light source, the operating device comprises a touch-sensitive operating element, which is designed to be operated by means of touch by a user, a proximity switch, which is designed to switch on the touch-sensitive operating element when the user approaches the touch-sensitive operating element, and a control device, which is designed to control a multicolored light source. In this case, the control device is designed to control the multicolored light source with a predetermined number of colors and brightnesses, and the touch-sensitive operating element is designed to select a color and a brightness from the predetermined number of colors and brightnesses depending on the touch by the user.

The multicolored light source can then be operated with the selected color at the selected brightness by the operating device.

In this case, an operating device described here is based on the concept, inter alia, of enabling a user to select a color and also a brightness from a restricted, predetermined number of colors and brightnesses.

In accordance with at least one embodiment of the operating device, the control device is designed to control the multicolored light source with a predetermined number of at least three and at most 500 predetermined colors. That is to say that the user cannot select from a confusingly large number of colors with which the multicolored light source can be operated, rather the number of colors is restricted to a maximum of 500 colors. In this case, it has been found that 500 colors are sufficient for most applications in general lighting. Furthermore, it has been found that a user is not overtaxed by the predetermination of a maximum of 500 colors. With the predetermination of more, for example of 1000, 10,000 or even more colors, it can be observed that the user can decide on a color only poorly and is often not content with the selected color. Therefore, particularly in use for general lighting, the restriction to a predetermined number of colors constitutes a desirable simplification.

In accordance with at least one embodiment of the operating device, the control device is designed to control the multicolored light source with a predetermined number of at least four and at most 100 brightnesses. That is to say that the user can choose between at most 100 different brightnesses for each of the predetermined colors. It has been found that this predetermination also makes it easier for the user to select a desired brightness of the illumination and, in general lighting, for example, is preferable to an infinitely variable or quasi infinitely variable regulation of the brightness.

In accordance with at least one embodiment of the operating device, the predetermined colors and brightnesses are loaded into a memory unit of the control device for example before the start-up of the operating device by means of a computer or as early as during the manufacture of the operating device. Furthermore, it is possible for the operating device to be connected to a computer, for example in the building in which the operating device is situated. In each operating device in the building, the computer can then store different brightnesses and colors that are available for selection. Furthermore, it is possible for the selectable colors and brightnesses to differ at different times of day. In this way, it is possible, for example, for the operating device to offer to the user for selection a different color spectrum during the day than at night. The advantage of the operating device then resides, in particular, in the simplicity thereof. After configuration once—which can, if appropriate, already be effected by the manufacturer of the operating device—the system can be operated intuitively.

In accordance with at least one embodiment of the operating device, the operating device comprises a touch-sensitive operating element having an operating surface, which is designed to emit light during operation, said light having a color similar or identical to the selected color. That is to say that the operating surface, which is operated by the user by means of touch by the user, itself emits light. The emitted light then has a color which the human user cannot distinguish or can scarcely distinguish from the color which is emitted by the multicolored light source. This proves to be advantageous, for example, if the operating device is used to operate a multicolored light source which is not arranged in the user's field of vision. By way of example, in this way, exterior lighting of a building can be operated from inside with the desired color, without the user having to have a free view of the operated multicolored light source.

In accordance with at least one embodiment of the operating device, the touch-sensitive operating element comprises an operating surface, which is designed to emit light during operation, said light having a brightness similar or proportional to the selected brightness. That is to say that the greater the brightness chosen for the light emitted by the multicolored light source, the more brightly the operating surface also emits the light having the selected color.

In accordance with at least one embodiment of the operating device, the operating device comprises an acoustic switch, which is designed to switch on the touch-sensitive operating element upon reception of an acoustic signal having a predetermined volume. That is to say that if the operating element receives an acoustic signal that exceeds a specific predetermined volume, then the touch-sensitive operating element is switched on. By way of example, the touch-sensitive operating element, after switch-on can emit light from its operating surface, such that the operating device can readily be found even in darkness.

The acoustic signal can be, for example, the noise of a clap or the noise of a door being unlocked. If the acoustic switch then receives one of these acoustic signals, the touch-sensitive operating element is activated and light is emitted from the operating surface, such that the operating device can be found in a simple manner, for example directly after a room has been entered. Furthermore, it can be possible that, as a result of the actuation of the acoustic switch by means of the acoustic signal, the operating device switches on the multicolored light source. The operating device can then operate the multicolored light source in the sense of a "panic light".

In accordance with at least one embodiment of the operating device, the operating device comprises at least one light emitting diode designed to generate at least part of the light emitted by the operating surface during operation. The light emitting diode can then be, for example, a so-called RGB light emitting diode, comprising at least one inorganic light emitting diode chip that emits green light, one that emits red light and one that emits blue light. The at least one light emitting diode then provides backlighting of the touch screen, for example.

In accordance with at least one embodiment of the operating device, the touch-sensitive operating element comprises a touch-sensitive OLED (organic light emitting diode), wherein an emission area of the touch-sensitive OLED forms the operating surface. By way of example, the touch-sensitive operating element consists of a touch-sensitive OLED designed to generate light of different colors and different brightnesses.

In accordance with at least one embodiment of the operating device, the operating surface is unstructured. That is to say that the operating surface is embodied for example as a smooth area having no structuring and no different identifications such as, for example, inscriptions or symbols. The operating surface is then formed, for example, by the unstructured luminous operating surface, into which the proximity sensor can be integrated in a manner not visible to the user. The operating device is then operated by the user by simple stroking along the operating surface. By way of example, the multicolored light source driven by the operating device can be switched on by simple tapping of the operating surface of the touch-sensitive operating element. The desired color can be selected by a finger stroke toward the left or right, and the desired brightness can be selected by a finger stroke upward or downward. The operating device can thus be operated intuitively like a light switch in this way.

In this case, an unstructured operating surface can additionally also be understood to be an operating surface at which no structure is visible. That is to say that at the operating surface, therefore, no symbols or similar structures as in the case of a screen are represented either, rather the operating surface emits light homogeneously and uniformly in a single color.

In accordance with at least one embodiment of the operating device, the operating device comprises a carrier frequency adapter, which is designed to supply the operating device with an operating current and which is designed to exchange control signals between the operating device and the multicolored light source. In other words, the operating device can be drivable by means of a so-called "power line interface". The operating device can then be connected via a carrier frequency installation to the multicolored light source and/or a computer for the configuration of the operating device. As a result, it is possible, in particular, that the operating device can be operated in an existing building without relatively great conversion measures. The control signals for driving the multicolored light source are forwarded by means of the carrier frequency installation via the carrier frequency adapter from the operating device by means of existing current lines to the multicolored light source. The configuration of the operating device can likewise be effected via the current line.

An illumination device is furthermore specified. In accordance with at least one embodiment of the illumination device, the illumination device comprises at least one multicolored light source designed to emit light with variable colors and brightnesses. Furthermore, the illumination device comprises an operating device as described in connection with at least one of the embodiments specified above. In this case, the operating device is electrically conductively connected to the at least one multicolored light source for the purpose of driving the at least one multicolored light source. By way of example, the illumination device is provided for general lighting in or outside a building.

In other words, an operating device described here is used for driving the at least one multicolored light source of the illumination device. Therefore, all features disclosed for the operating device are also disclosed for the illumination device, and vice versa.

In accordance with at least one embodiment of the illumination device, the illumination device comprises at least one multicolored light source comprising at least two light emitting diode chips. By way of example, the multicolored light source comprises a multiplicity of so-called RGB light emitting diodes.

In accordance with at least one embodiment of the illumination device, the at least one multicolored light source comprises an OLED. In this case, the OLED can be suitable for generating multicolored light. Furthermore, it is possible for the illumination device to comprise at least one OLED and at least one inorganic light emitting diode chip.

In particular, it is possible for the multicolored light source to comprise the same luminous means which are also used for generating the light in the operating device, which leaves the operating device through the operating surface. In this way, the light emitted by the multicolored light source during operation can be simulated by the operating device in a particularly simple manner, in particular with regard to the color of the emitted light.

In accordance with at least one embodiment of the illumination device, the operating device and the at least one multicolored light source respectively comprise a carrier frequency adapter designed to supply the operating device and the at least one multicolored light source with an operating current. In other words, the operating device and the multicolored light source are connected to a carrier frequency installation. The operating device and the multicolored light source draw the current required for operation for example via a current line, via which the control signals for operating the multicolored light source are also distributed. In other words, the operating device is then designed to control the at least one multicolored light source by means of control signals impressed on a current line.

BRIEF DESCRIPTION OF THE DRAWINGS

The operating device described here and the illumination device described here are explained in greater detail below on the basis of exemplary embodiments and the associated figures.

FIGS. 1A, 1B, 2A, 2B, 2C and 2D show schematic views of operating devices described here.

DETAILED DESCRIPTION OF THE DRAWINGS

Figure 2A:
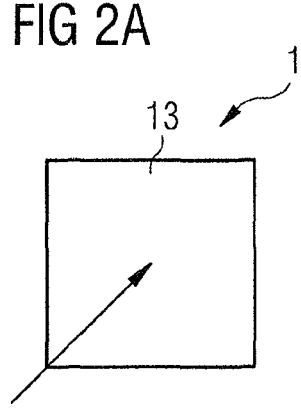
Figure 2B:
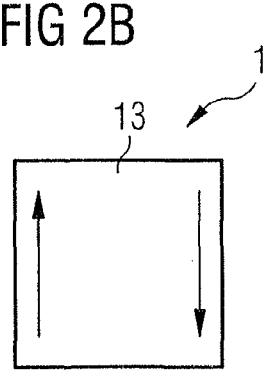

Elements that are identical, of identical time or act identically are provided with the same reference symbols in the figures. The figures and the size relationships of the elements illustrated in the figures among one another should not be regarded as to scale. Rather, individual elements may be illustrated with an exaggerated size in order to enable better illustration and/or in order to afford a better understanding.

FIG. 1A shows a schematic plan view of an operating device 1 described here. The operating device 1 comprises a touch-sensitive operating element 10. From outside the operating device 1, the user looks at the operating surface 13. In the present case, the operating surface 13 is embodied such that it is unstructured and optically opaque. That is to say that the elements shown in FIG. 1A such as light emitting diodes 15, proximity switch 11 and acoustic switch 14 are visually imperceptible to the user. The user only sees the unstructured operating surface, which can be formed with a glass pane, for example.

The operating device comprises a proximity switch 11. The proximity switch 11 detects the approach of an object, for example a human hand, and switches on the touch-sensitive operating element 10 (in this respect, also see, for example, the sectional illustration in FIG. 1B). The touch-sensitive operating element is designed to process touches of the operating surface 13 and to forward them to the control device 12. The control device 12 is then designed to drive a connected multicolored light source 2 (in this respect, also cf. FIG. 3).

In the present case, the operating device furthermore comprises an acoustic switch 14, which is optional. The acoustic switch 14 is designed for detecting an acoustic signal which has or exceeds a predetermined volume. By means of the acoustic switch 14, the touch-sensitive operating element can be switched on. Furthermore, it is possible that the multicolored light source 2 driven by the operating device is also switched on by means of the acoustic switch 14. The operating device then additionally has the function of a so-called "panic light".

The operating device furthermore comprises light emitting diodes 15, inorganic light emitting diodes being involved in the present case. The light emitting diodes 15 serve for generating light which leaves the operating device through the operating surface 13. By way of example, upon the approach of an object, for example a human hand, the operating surface 13 can briefly emit light (for example in a pulsating fashion) or emit light in continuous operation, in order to indicate activation of the touch-sensitive operating element. The touch-sensitive operating element is then operated by the touching of the operating surface by the user.

As an alternative to the exemplary embodiment shown in FIG. 1A, the light emitting diodes 15 can also be dispensed with and the touch-sensitive operating element is formed by a touch-sensitive OLED.

The operating device 1 furthermore comprises a carrier frequency adapter 16 by means of which the operating device can be connected to a carrier frequency installation. Signals for driving the multicolored light source 2 then leave the operating device 1 via the carrier frequency adapter 16. Furthermore, signals for the configuration of the operating device 1 can pass into the control device 12 through the carrier frequency adapter 16. The control device 12 comprises, for example, a memory unit 12a, in which a predetermined number of colors and brightnesses are stored, with which the connected multicolored light source(s) can be driven. In this case, the memory unit 12a can be operated, for example, by means of signals that are then pressed into the illumination device 1 via the carrier frequency adapter 16.

The operation of an operating device described here by a user is explained briefly in conjunction with the schematic plan views in FIGS. 2A to 2D of an operating surface 13 of an operating device described here.

The effect of the proximity switch 11 is illustrated schematically in conjunction with FIG. 2A. Upon the approach of an object, for example a hand, the touch-sensitive operating element 10 is activated. By way of example, the operating surface 13 can briefly emit light in a pulsating fashion or emit light in continuous operation.

It is illustrated in conjunction with FIG. 2, that the brightness of the light generated by the multicolored light source 2 can be set by stroking movement, for example with the fingertips upward and downward. In this case, the user can choose preferably from a predetermined number of brightnesses. By way of example, the user can choose between at least four brightnesses. Furthermore, it is possible for the user to have at most a selection of between 100 brightnesses.

Figure 2C:
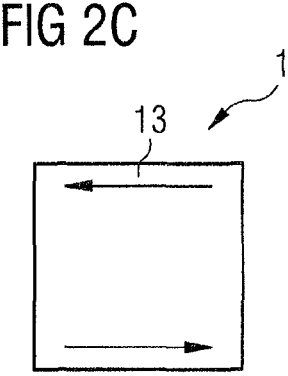

It is illustrated in conjunction with FIG. 2C that the user can select a color for operating the multicolored light source from the predetermined number of colors for example by moving the fingertips along the operating surface 13 toward the right or left. The set of predetermined colors (the so-called "color set") can be predetermined by the manufacturer or, for example, by means of a PC via the carrier frequency adapter 16 in the memory unit 12a of the control device 12 of the operating device 1.

Figure 2D:
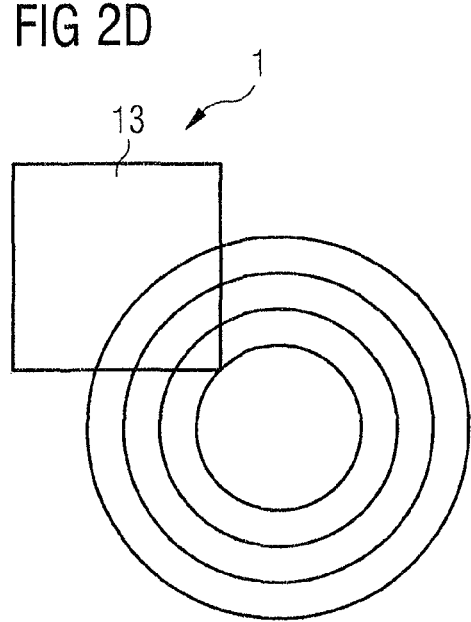

The switching-on of the operating device 1 by means of an acoustic signal, for example by means of a clap, is illustrated schematically in conjunction with FIG. 2D. The acoustic switch 14 can be switched on and off via a connected PC, for example, such that operation without sensitivity of the operating device to acoustic signals is also possible.

Figure 3:
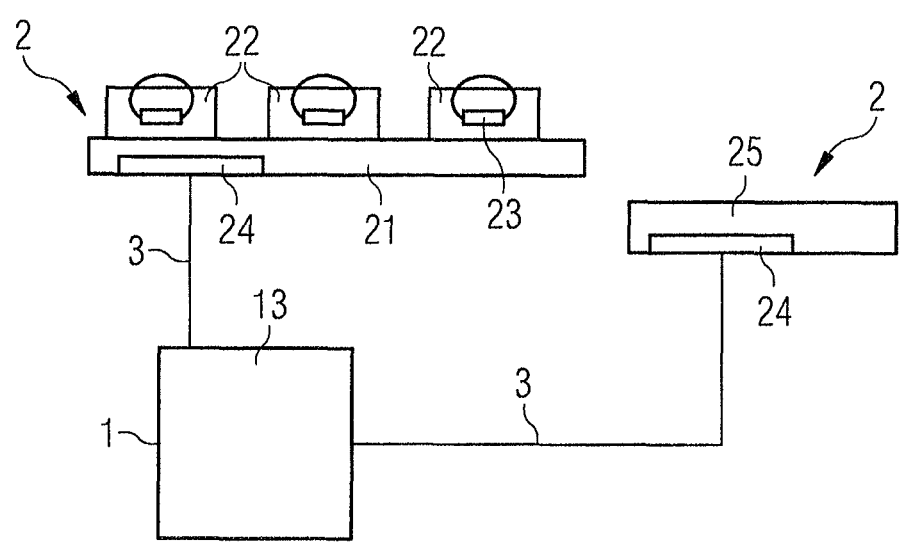
FIG. 3 shows a schematic view of an illumination device described here.

An illumination device described here is illustrated schematically in conjunction with FIG. 3. The illumination device comprises an operating device 1 described here. In the present case, the operating device 1 controls two multicolored light sources 2. For this purpose, the operating device 1 is connected via a current line 3 to the carrier frequency adapters 24 of the light sources 2. The current line 3 provides not only for conducting signals but also for energizing the operating device 1 and the multicolored light sources 2 with the necessary operating current.

In the present case, two different multicolored light sources 2 are controlled by the operating device 1. One multicolored light source 2 comprises light emitting diodes 2, each preferably comprising at least two light emitting diode chips 23, which are designed to emit light of mutually different colors. By way of example, the light emitting diodes 22 are in each case so-called RGB light emitting diodes. The light emitting diodes can be arranged on a connection carrier 21, onto which or into which the carrier frequency adapter 24 can also be integrated.

The other multicolored light source 2 is an OLED 25, which, for example, is likewise suitable for generating multicolored light.

The operating device 1 described here and the illumination device described here are distinguished, in particular, by their simplicity. After the operating device has been configured once—which, if appropriate, can already be effected by the manufacturer of the operating device—the operating device can be operated intuitively. By virtue of features that can be integrated into the operating device such as a "panic light" function by means of the acoustic switch, further auxiliary devices become superfluous. On account of the carrier frequency adapter of the operating device, it is possible to install and maintain all operating devices in one housing centrally from a computer. Additional cables also for the operation of the multicolored light sources do not have to be laid in the building.

The invention is not restricted to the exemplary embodiments by the description on the basis of said exemplary embodiments. Rather, the invention encompasses any novel feature and also any combination of features, which in particular includes any combination of features in the patent claims, even if this feature or this combination itself is not explicitly specified in the patent claims or exemplary embodiments.

I claim:

1. An operating device for driving a multicolored light source comprising:
    a touch-sensitive operating element configured to be operated by a touch of a user, the touch-sensitive operating element having an operating surface embodied as a smooth area that has no identifications;
    a proximity switch configured to switch on the touch-sensitive operating element when the user approaches the touch-sensitive operating element; and
    a control device configured to control a multicolored light source
    with a predetermined number of colors and brightness levels, wherein the touch-sensitive operating element is configured to select a color and a brightness from the predetermined number of colors and brightness levels depending on the touch of the user.

2. The operating device according to claim 1, wherein the control device is configured to control the multicolored light source with a predetermined number of at least three and/or at most 500 predetermined colors.

3. The operating device according to claim 1, wherein the control device is configured to control the multicolored light source with a predetermined number of at least four and/or at most 100 brightness levels.

4. The operating device according to claim 1, wherein the touch-sensitive operating element comprises an operating surface, which is configured to emit light during operation, said light having a color similar or identical to the selected color.

5. The operating device according to claim 1, wherein the touch-sensitive operating element comprises an operating surface, which is configured to emit light during operation, said light having a brightness similar or proportional to the selected brightness.

6. The operating device according to claim 1, comprising an acoustic switch, which is configured to switch on the touch-sensitive operating element upon reception of an acoustic signal having a predetermined volume.

7. The operating device according to claim 6, comprising at least one light emitting diode configured to generate at least part of the light emitted by the operating surface during operation.

8. The operating device according to claim 1, wherein the touch-sensitive operating element comprises a touch-sensitive OLED, wherein an emission area of the touch-sensitive OLED forms the operating surface.

9. The operating device according to claim 1, wherein the operating surface is unstructured.

10. The operating device according to claim 1, comprising a carrier frequency adapter, which is designed to supply the operating device with an operating current and which is configured to exchange control signals between the operating device and the multicolored light source.

11. An illumination device comprising:
   at least one multicolored light source adapted to emit light with variable colors and brightness levels, and
   an operating device according to claim 1, wherein the operating device is electrically conductively connected to the at least one multicolored light source for driving the at least one multicolored light source.

12. The illumination device according to claim 11, wherein the at least one multicolored light source comprises at least two light emitting diode chips.

13. The illumination device according to claim 11,
   wherein the at least one multicolored light source comprises at least one OLED.

14. The illumination device according to claim 11,
   wherein the operating device and the at least one multicolored light source respectively comprise a carrier frequency adapter configured to supply the operating device and the at least one multicolored light source with an operating current.

15. The illumination device according to claim 14,
   wherein the operating device is configured to control the at least one multicolored light source by means of control signals impressed on a current line.

16. An operating device for driving a multicolored light source comprising:
   a touch-sensitive operating element, which is configured to be operated by touch of a user, the touch-sensitive operating element having an operating surface embodied as a smooth area that has no identifications;
   a proximity switch, which is configured to switch on the touch-sensitive operating element when the user approaches the touch-sensitive operating element; and
   a control device, which is configured to control a multicolored light source, wherein the control device is configured to control the multicolored light source with a predetermined number of colors and brightness levels,
   wherein the touch-sensitive operating element is configured to select a color and a brightness from the predetermined number of colors and brightnesses depending on the touch by the user,
   wherein the touch-sensitive operating element comprises an operating surface, which is configured to emit light during operation, said light having a color similar or identical to the selected color, and
   wherein the operating surface is unstructured.

17. The illumination device according to claim 16, wherein the control device is configured to control the multicolored light source with a predetermined number of at least four and/or at most 100 brightness levels, and
   the control device is configured to control the multicolored light source with a predetermined number of at least three and/or at most 500 predetermined colors.

18. An illumination device comprising:
   at least one multicolored light source adapted to emit light with variable colors and brightness levels, and
   an operating device for driving a multicolored light source comprising:
   a touch-sensitive operating element, which is adapted to be operated by touch of a user, the touch-sensitive operating element having an operating surface embodied as a smooth area that has no identifications;
   a proximity switch, which is configured to switch on the touch-sensitive operating element when the user approaches the touch-sensitive operating element; and
   a control device, which is configured to control a multicolored light source, wherein the control device is configured to control the multicolored light source with a predetermined number of colors and brightness levels,
   wherein the touch-sensitive operating element is configured to select a color and a brightness from the predetermined number of colors and brightness levels depending on the touch by the user,
   wherein the touch-sensitive operating element comprises an operating surface, which is configured to emit light during operation, said light having a color similar or identical to the selected color, and the operating surface is unstructured,
   wherein the operating device is electrically conductively connected to the at least one multicolored light source for driving the at least one multicolored light source.

* * * * *